United States Patent
Subramanian

(12) 
(10) Patent No.: US 11,238,522 B1
(45) Date of Patent: Feb. 1, 2022

(54) LEVERAGING PREDICTIVE MODELING FOR APPLICATION OPTIMIZATION

(71) Applicant: WALGREEN CO., Deerfield, IL (US)

(72) Inventor: Kartik Subramanian, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 1027 days.

(21) Appl. No.: 15/142,557

(22) Filed: Apr. 29, 2016

(51) Int. Cl.
*G06Q 30/06* (2012.01)
*G06N 5/02* (2006.01)
*H04W 4/33* (2018.01)

(52) U.S. Cl.
CPC ......... *G06Q 30/0639* (2013.01); *G06N 5/022* (2013.01); *G06Q 30/0623* (2013.01); *H04W 4/33* (2018.02)

(58) Field of Classification Search
CPC .......... G06Q 30/0639; G06Q 30/0623; G06N 5/022; H04W 4/043
USPC ...................................... 705/26.61
See application file for complete search history.

(56) References Cited

U.S. PATENT DOCUMENTS

| | | | | |
|---|---|---|---|---|
| 10,423,973 B2* | 9/2019 | Milton | | G06Q 30/02 |
| 10,572,887 B2* | 2/2020 | Weiss | | G06Q 30/02 |
| 2002/0065713 A1* | 5/2002 | Awada | | G06Q 30/02 |
| | | | | 705/14.39 |
| 2012/0271715 A1* | 10/2012 | Morton | | G06Q 30/0257 |
| | | | | 705/14.53 |
| 2015/0161665 A1* | 6/2015 | Grimes | | G06Q 30/0261 |
| | | | | 705/14.53 |

OTHER PUBLICATIONS

Esmaeilpour, M., Naderifar, V., & Sulaiman, R. (Jun. 2010). Predict the customer behavior in the shopping by distributed learning automata. In 2010 International Symposium on Information Technology (vol. 3, pp. 1688-1672). IEEE. (Year: 2010).*

* cited by examiner

*Primary Examiner* — Michelle T Kringen
*Assistant Examiner* — Elisa H Yang
(74) *Attorney, Agent, or Firm* — Marshall, Gerstein & Borun LLP

(57) ABSTRACT

Techniques are disclosed for leveraging user shopping habits to deliver store-relevant materials in a more efficient manner. User location and other relevant information may be analyzed to predict an in-store shopping path for future visits, which may include different store areas each having different store-relevant materials (e.g., coupons) associated therewith. Upon a user visiting the store on a future visit, the predicted path may be used to upload data to the user's portable computing device for store-relevant materials in the order in which they will likely be needed. As the user moves within the store, the portable computing device may purge data associated with store areas that have already been visited while pre-fetching the next store area likely to be visited next.

17 Claims, 6 Drawing Sheets

LEVERAGING PREDICTIVE MODELING FOR APPLICATION OPTIMIZATION

TECHNICAL FIELD

The present disclosure relates generally to location tracking and, more particularly, to using location tracking to improve the relevance of targeted messages directed to a user and to reduce application memory usage.

BACKGROUND

In many cases, a customer may visit a physical retail store location or a retailer's online store to purchase their products. To incentivize customers to do so, retailers have traditionally provided promotional materials such as coupons and informational material such as product descriptions or store events, which are increasingly being offered in a digital format versus the paper-clipped variety. With the introduction of such informational and promotional content, retailers have more options for easily delivering the same to customers, such as email, text messaging, online, and via a specific retailer application, which may be installed and operated on a smartphone.

As an example, digital coupons are typically stored and displayed on a relevant device as image files. For example, in the case of a smartphone application, the digital coupon data may be stored on a smartphone memory and presented to a user via the smartphone display once selected. Because of the graphical nature of digital coupons, storing several in a device memory may require a great deal of memory space, which is a cause for concern in portable devices such as smartphones that may have several other applications installed—all vying for memory space. Furthermore, traditional methods of digital coupon delivery do not take into consideration information about the user or the user's location, resulting in a large amount of coupons being irrelevant for a particular user's needs.

As a result, providing store-relevant materials in a digital format may provide a greater convenience over traditional paper coupons for customers, but doing so presents several challenges.

SUMMARY

Various embodiments are described herein that facilitate store-relevant materials being delivered at a relevant time for a particular user. In some embodiments, different types of information are utilized to predict a user's shopping path within a physical retail store. Some of the information that may be analyzed to predict the user's shopping path may include user demographics, information about the user's portable computing device (e.g., a smartphone that executes an application and displays the store-relevant materials), information about the particular store the user regularly visits, tracked location data indicating a previous shopping path within the store (or other stores), etc.

In accordance with some embodiments, the calculated predicted shopping path may include information identifying each store area, department, the order in which the user visited each area, and/or the time in which the user spent at each store area or department during a store visit. Each store area may also be associated with store-relevant materials such as promotional materials, coupons, or other relevant messages or notifications. Typically, a user may install a retail application to a portable computing device, which may download informational and promotional materials for an entire store.

However, digital store-relevant materials may take up a large amount of memory storage space, and because the materials are applicable to an entire store, the majority of the downloaded materials may be irrelevant for the user. Therefore, in accordance with various embodiments, a predicted shopping path may be calculated such that store-relevant materials associated with the next area in the store most likely to be visited by the user, but not others, is uploaded to the user's portable computing device at any given time. Thus, once the portable computing device is actually within a threshold range of a predicted location along the calculated predicted shopping path, the necessary materials will have already been downloaded and may be quickly displayed.

Furthermore, because the predicted shopping path may include the order in which a user is likely to visit one or more store areas, this information may be leveraged to allow less material data to be stored on the portable computing device at any given time. That is, as a user walks around the store, it is assumed that he will follow the calculated predicted shopping path. If so, as an example, promotional material data associated with one store area may be purged as the user leaves each store area. Once purged, the same promotional material data may be downloaded for the next store area that the user is most likely to visit such that, once the user arrives at that store area, the promotional materials are already available, and so on.

In the event that the user's actual shopping path deviates from the calculated predicted shopping path, embodiments include adjusting the calculation of the predicted shopping path to improve its accuracy over time. For example, after or during a store visit, locations along the user's actual shopping path may be compared to those in the predicted shopping path, with any differences being used as feedback to adjust the calculation of the predicted shopping path for future predictions.

BRIEF DESCRIPTION OF THE DRAWINGS

The Figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
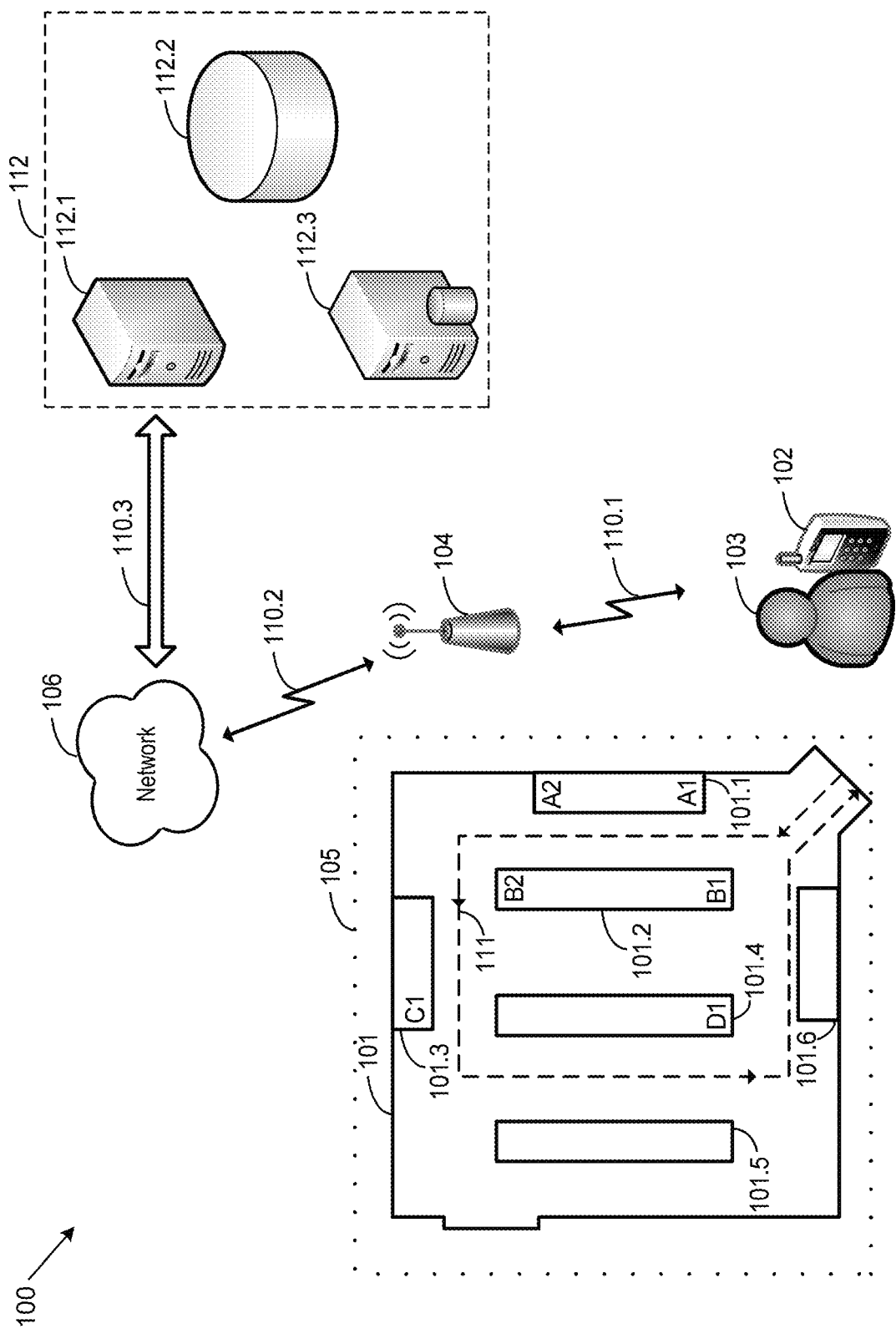
FIG. 1 is a block diagram of an exemplary application optimization system 100 in accordance with an embodiment of the present disclosure.

FIG. 1 is a block diagram of an exemplary application optimization system 100 in accordance with an embodiment of the present disclosure. Optimization system 100 includes a retail store 101, a portable computing device 102, which may be operated by a user 103, a base station 104, a communication network 106, and one or more back-end components 112.

For the sake of brevity, optimization system 100 is illustrated as including a single portable computing device 102, a single user 103, a single retail store 101, a single network 106, and a single set of one or more back-end components 112. However, the embodiments described herein may include any suitable number of such components. For example, back-end components 112 may communicate with several portable computing devices 102, each of which being operated by a respective user 103, to track their location and/or receive other types of information used in the calculation of predicted shopping paths, as further discussed herein. To provide another example, back-end components 112 may monitor data received from one or more portable computing devices such that the shopping habits of each user may be assessed for several stores.

Retail store 101 may be any suitable type of store in which suitable store-relevant materials including promotional materials, coupons, messages, notifications, informational notices, seasonal notices, advertisements, etc., may be applicable. In various embodiments, the store-relevant materials may be applicable for the entire store or for one or more portions, departments, or areas thereof. For example, retail store 101 may have several areas 101.1-101.6, which may correspond to different departments within retail store 101 where different items are sold. For example, areas 101.1, 101.2, 101.3, 101.4, 101.5, and 101.6 may correspond to the beauty department, the health and wellness department, the pharmacy department, the home supplies department, the photo department, and a point of sale, respectively.

Predicted shopping path 111 may represent a dynamically calculated shopping path or a predetermined shopping path, depending on the data that is available for a particular user. For example, assume that a user has visited the store on several previous occasions. In such a case, then the shopping paths from the user's previous shopping visits may be used to determine which shopping area within the store has the highest statistical probability of being next visited by the user during a subsequent store visit. Thus, in such a scenario, predicted shopping path 111 may represent an aggregated path that is the result of each of these calculations as a user moves throughout a store, and is not fixed but rather dynamically adjusted in this manner.

However, in the event that user information is not available (e.g., a new or unknown user starts shopping) then predicted shopping path 111 may represent a predetermined path that best matches other parameters that may be available to one or more back-end components 112. For example, although detailed user information may not be available, portable computing device 102 may be able to be uniquely identified (e.g., via media access control (MAC) address) and/or other information may be available via communications with portable communications device 102 such as the operating system, hardware model, etc. In this case, one or more back-end components 112 may select predicted shopping path 111 from one that best matches other paths using similar data. Further details of how both dynamic and predetermined predicted shopping paths are calculated are discussed below.

In any event, for a particular shopping visit, predicted shopping path 111 may represent a shopping path that has the highest statistical probability of being taken by user 103 within a particular retail store 101. For example, as shown in FIG. 1, predicted shopping path 111 indicates a user entering retail store 101, walking past areas 101.1 and 101.2, walking past area 101.3, walking between areas 101.4 and 101.5, paying at area 101.6, and exiting retail store 101.

In an embodiment, retail store 101 may be associated with a boundary 105. In an embodiment, boundary 105 may represent any suitable boundary to appropriately identify the location of retail store 101. For example, boundary 105 may represent a geofence including a range of geographic coordinates (e.g., latitude and longitude) such that, when a location of portable computing device 102 crosses boundary 105, portable computing device 102 and/or one or more back-end components 112 may determine that user 103 has also crossed boundary 105. Thus, a conclusion may be made that user 103 has engaged in a store visit at retail store 101 and/or exited retail store 101 after a store visit has been completed. In this way, boundary 105 may facilitate the determination of which stores a user has visited, when, how often, etc. As will be further discussed below, this information may be used as part of the predictive modeling process to calculate the user's next most likely location within store 101.

Base station 104 may be configured to facilitate communications between one or more portable computing devices 102 and communication network 106 using any suitable number of wired and/or wireless links, such as links 110.1-110.2, for example. Although base station 104 is illustrated in FIG. 1 as wirelessly communicating with communication network 106, embodiments include base station 104 connecting to communication network 106 via any suitable number of wired and/or wireless links. For example, base station 104 may be coupled to communication network 106 via one or more landline, internet service provider (ISP) backbone connections, satellite links, a public switched telephone network (PSTN), etc. In various embodiments, base station 104 may be implemented as an access point (AP), a macrocell, a femtocell, etc.

Communication network 106 may be configured to facilitate communications between one or more portable computing devices 102 and one or more back-end components 112 using any suitable number of wired and/or wireless links, such as link 110.3, for example. Communication network 106 may include any suitable number of nodes, additional wired and/or wireless networks, etc., in various embodiments, to facilitate this functionality. For example, in an embodiment, communication network 106 may be implemented as a local area network (LAN), a metropolitan area network (MAN), a wide area network (WAN), or any suitable combination of local and/or external network connections. To provide further examples, communications network 106 may include wired telephone and cable hardware, satellite, cellular phone communication networks, etc. In an embodiment, communication network 106 may provide one or more portable computing devices 102 with connectivity to network services, such as Internet services, for example, and/or support application programming interface (API) calls between one or more portable computing devices 102 and one or more backend computing devices 112.

Portable computing device 102 may be configured to communicate using any suitable number and/or type of communication protocols, such as Wi-Fi, cellular, BLUETOOTH, NFC, RFID, etc. For example, portable computing device 102 may be configured to communicate with base station 104 using a cellular communication protocol to send data to and/or receive data from one or more back-end components 112 via communication network 106 using one or more of links 1101-110.3. To provide another example, portable computing device 102 may be configured to communicate with one or more communication devices located in retail store 101, which may assist in the identification of areas 101.1-101.6 used to calculate predicted shopping path 111.

In various embodiments, portable computing device 102 may be implemented as a user equipment (UE) and/or client device, such as a smartphone, for example. Although portable computing device 102 is illustrated in FIG. 1 as a phone, portable computing device 102 may be implemented as any suitable communication device. For example, portable computing device 102 may be implemented as a personal digital assistant (PDA), a tablet computer, a laptop computer, a wearable electronic device, etc.

As further discussed below, data transmitted by portable computing device 102 to one or more backend computing devices 112 may include, for example, any suitable information used by one or more back-end components 112 as part of the calculation of predicted shopping path 111 for user 103. For example, as will be further discussed below, portable computing device 102 may transmit location information (e.g., geographic coordinates) that indicate the current location of portable computing device 102 and/or a history of tracked locations (within retail store 101 and/or outside of retail store 101), timestamps, an indication of whether portable computing device 102 has crossed boundary 105, the details of one or more shopping paths taken by user 103 in previous visits to retail store 101 (or other retail stores) such as the order of areas visited, how often the user remained in such areas, information used to uniquely identify user 103, etc.

Furthermore, data received by portable computing device 102 from one or more back-end components 112 may include any suitable information used to display store-relevant materials to user 103 during a store visit. For example, as will be further discussed below, portable computing device 102 may receive notifications, coupons, messages, etc., relevant to one or more store areas 101.1-101.6 within retail store 101. Based upon the user's current location along calculated predicted shopping path 111, one or more back-end components may determine which store-relevant materials to upload to portable computing device 102 and when to do so, such that the store-relevant materials are ready to be viewed by user 103 once user 103 actually visits the predicted store area along predicted shopping path 111.

Portable computing device 102 may be configured to execute an application installed thereon to perform one or more functions of the various embodiments described herein. For example, an application, which will be further discussed in detail below, may be downloaded and installed on portable computing device 102. The application may be configured to facilitate various functions, such as supporting communications between portable computing device 102 and one or more back-end components 112, downloading store-relevant materials to portable computing device 102, and/or displaying store-relevant materials via portable computing device 102. The application installed on portable computing device 102 may also communicate user information identifying user 103 to one or more back-end components 118. This user information may include any suitable type of information to identify user 103 so that the user 103 may later be matched to her user profile data stored in one or more back-end components 112. For example, the user information may include a username used to log on to the retailer's website or web-based application, a first and last name of user 103, etc.

To provide an illustrative example, upon installing and launching the application on portable computing device 102, user 103 may be prompted to enter login information and/or complete an initial registration process to create a user profile. User 103 may initially create a user profile with the retailer upon first launching the application, through a registration process via a website, over the phone, etc. This user profile may include, for example, the customer's contact information, a preferred store, demographic information, preferred forms of payment (e.g., credit card numbers), etc.

In an embodiment, upon user 103 subsequently providing her login information, one or more back-end components 112 may link her login information to other information that may be used in the calculation of predicted shopping paths, but which do not need to be entered by the user. For example, portable computing device 102 may transmit other data as part of an API services call to one or more back-end components 112 along with the login information, such as device information (e.g., location information, model information of portable computing device 102, an operating system utilized by portable computing device 102, a unique identifier associated with portable computing device 102, etc.). In this way, additional information may be collected as part of the user's profile for the calculation of predicted shopping path without the user having to manually submit this information.

One or more back-end components 112 may include any suitable number of components configured to receive data from and/or send data to one or more of portable computing devices 102 via communication network 106 using any suitable number of wired and/or wireless links. In various embodiments, one or more back-end components 112 may be configured to execute one or more applications to perform one or more functions associated with the embodiments as discussed herein.

For example, as shown in FIG. 1, one or more back-end components 112 may include one or more external computing devices such as servers 112.1, databases 112.2, and/or database servers 112.3. Although FIG. 1 illustrates one or more back-end components 112 as including only three different types of back-end components, embodiments include one or more back-end components 112 implementing any suitable number and/or type of back-end components to facilitate the appropriate functions of the embodiments as described herein.

For example, database server 112.3 may be implemented as any suitable number of servers that are configured to access data from database 112.2, which may store any suitable type of data as further discussed in detail below. To provide another example, server 112.1 may be implemented as any suitable number of web servers configured to provide Internet communications to one or more of portable computing devices 102, to process API service calls, and/or to support one or more applications installed on one or more of portable computing devices 102.

Furthermore, one or more back-end components 112 may store and/or access secure data that is of a private, proprietary, and/or sensitive nature. As a result, various embodiments of one or more back end components 112, communication network 106, and/or portable computing device 102 may implement appropriate security protocols such as encryption, secure links, network authentication, firewalls, etc., to appropriately protect such secure data.

In various embodiments, one or more of back-end components 112 may communicate with database 112.2 to store data to and/or to read data from database 112.2 as needed to facilitate the appropriate functions of the embodiments as described herein. Database 112.2 may be configured to store any suitable relevant data as described in the embodiments presented herein related to the operation of optimization system 100. Such data may include, for example, a user profile that includes user information, payment information, demographic information, contact information, a history of previous store visits (e.g., a history of store locations, when they were visited, and how long they were visited), one or more previous shopping paths (e.g., the order of specific areas within one or more retail stores), one or more calculated predicted shopping paths (e.g., predicted shopping path 111), a history of user online shopping sessions, the current and/or tracked location of a particular user (e.g., user 103) based upon the user's portable computing device (e.g., the location of portable computing device 102), store-relevant materials for different store areas and/or for different stores, etc.

Figure 2:
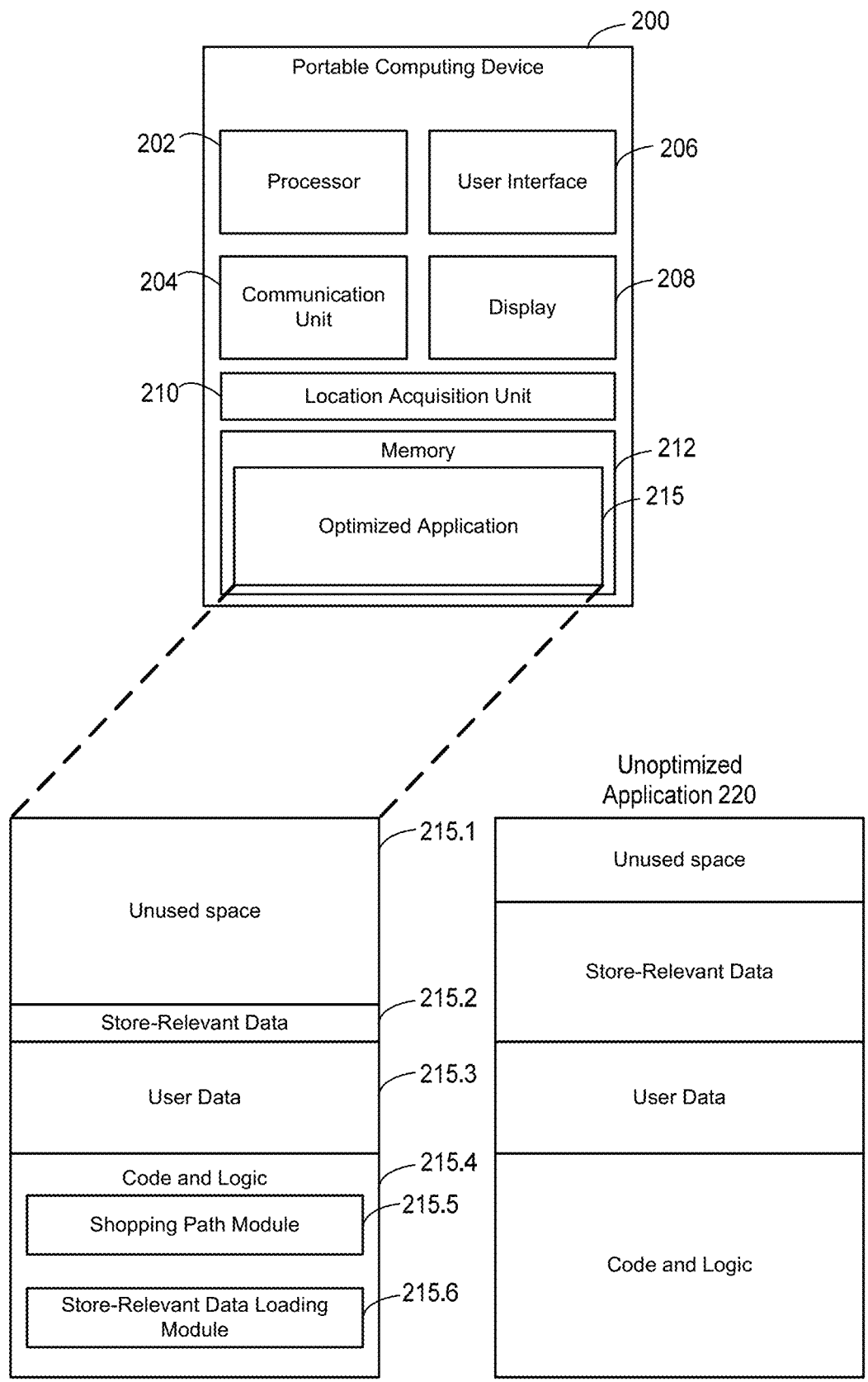
FIG. 2 is a block diagram of an exemplary portable computing device 200, according to an embodiment.

FIG. 2 is a block diagram of an exemplary portable computing device 200, according to an embodiment. In an embodiment, portable computing device 200 may be an implementation of portable computing device 102, for example, as shown in FIG. 1. In an embodiment, portable computing device 200 may include one or more processors 202, a communication unit 204, a user interface 206, a display 208, a location acquisition unit 210, and a memory unit 212.

Communication unit 204 may be configured to facilitate data communications between portable computing device 200 and one or more other communication devices and/or networks in accordance with any suitable number and/or type of communication protocols, which may be the same communication protocols as one another or different communication protocols based upon the particular network component and/or network that portable computing device 200 is communicating. For example, communication unit 204 may be configured to facilitate communications between portable computing device 200 and one or more back-end components (e.g., one or more back-end components 112, as shown in FIG. 1) via one or more communication networks.

To provide another example, communication unit 204 may be configured to facilitate communications between portable computing device 200 and one or more communication devices that may be located within a retail store at different respective store areas. Such communications may facilitate the determination of the order of various store areas visited by a user over one or more shopping trips. In various embodiments, communication unit 204 may be implemented with any suitable combination of hardware and/or software to facilitate this functionality. For example, communication unit 204 may be implemented with any suitable number of wired and/or wireless transceivers, network interfaces, physical layers (PHY), ports, etc. The details of such communications will be discussed in further detail below.

User interface 206 may be configured to facilitate user interaction with portable computing device 200. For example, user interface 206 may include a user-input device such as an interactive portion of display 208 (e.g., a "soft" keyboard displayed on display 208), an external hardware keyboard configured to communicate with portable computing device 200 via a wired or a wireless connection (e.g., a BLUETOOTH keyboard), an external mouse, or any other suitable user-input device.

Display 208 may be implemented as any suitable type of display that may facilitate user interaction, such as a capacitive touch screen display, a resistive touch screen display, etc. In various aspects, display 208 may be configured to work in conjunction with user-interface 206 and/or one or more processors 202 to detect user inputs upon a user selecting a displayed interactive icon or other graphic, to identify user selections of objects displayed via display 208, to display store-relevant materials associated with various areas of a retail store, etc.

Location acquisition unit 210 may be implemented as any suitable device configured to generate location data indicative of a current location of portable computing device 200. In an embodiment, location acquisition unit 210 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe.

Location acquisition unit 210 and/or one or more processors 202 may be configured to receive navigational signals from one or more satellites and to calculate a geographic location of portable computing device 200 using these signals. Location acquisition unit 210 may include one or more processors, controllers, or other computing devices and memory to calculate the geographic location of portable computing device 200 without one or more processors 202. Alternatively, location acquisition unit 210 may utilize components of one or more processors 202. Thus, one or more processors 202 and location acquisition unit 210 may be combined or be separate or otherwise discrete elements.

One or more processors 202 may be implemented as any suitable type and/or number of processors, such as a host processor for the relevant device in which portable computing device 200 is implemented, for example. One or more processors 202 may be configured to communicate with one or more of communication unit 204, user interface 206, display 208, location acquisition unit 210, and/or memory unit 212 to send data to and/or to receive data from one or more of these components.

For example, one or more processors 202 may be configured to communicate with memory unit 212 to store data to and/or to read data from memory unit 212. In accordance with various embodiments, memory unit 212 may be a computer-readable non-transitory storage device, and may include any combination of volatile (e.g., a random access memory (RAM)), or a non-volatile memory (e.g., battery-backed RAM, FLASH, etc.). In an embodiment, memory unit 212 may be configured to store instructions executable by one or more processors 202. These instructions may include machine readable instructions that, when executed by one or more processors 202, cause one or more processors 202 to perform various acts.

In an embodiment, optimized application 215 is a portion of memory unit 212 configured to store instructions, that when executed by one or more processors 202, cause one or more processors 202 to perform various acts in accordance with applicable embodiments as described herein. For example, instructions stored in optimized application 215 may facilitate one or more processors 202 performing functions such as determining when portable computing device 200 has entered a retail store, tracking the location of portable computing device 200 within a retail store to determine an order of areas visiting along a shopping path, sending information to one or more backend computing devices, receiving information from one or more backend computing devices, determining when store relevant data should be pre-fetched or purged, etc.

In some embodiments, optimized application 215 may reside in memory unit 212 as a default application bundle that may be included as part of the operating system (OS) of portable computing device 200. But in other embodiments, optimized application 215 may be installed on portable computing device 200 as one or more downloads, such as an executable package installation file downloaded from a suitable application store via a connection to the Internet.

For example, optimized application 215 may be stored in any suitable portions of memory unit 212 upon installation of a package file downloaded in such a manner. Examples of package download files may include downloads via the iTunes store, the Google Play Store, the Windows Phone Store, downloading a package installation file from another computing device, etc. Once downloaded, optimized application 215 may be installed on portable computing device 200 as part of an installation package such that, upon installation of optimized application 215, memory unit 212 may allocate various portions for different application functions, such as unused space 215.1, store relevant data 215.2, user data 215.3, and code and logic 215.4, for example.

The various allocated portions of optimized application 215 may represent, for example, portions of memory unit 212 that are associated with each respective function of optimized application 215. For example, unused space 215.1 may be a portion of memory unit 215 that is reserved by optimized application 215 for additional user data, additional store relevant data, and/or additional code and logic for future updates.

Store relevant data 215.2 may include data representative of various store-relevant materials that are, for example, received from one or more back-end components (e.g., one or more back-end components 112, as shown in FIG. 1). Again, this data may represent digital coupons, images, sounds, text, etc. As shown in FIG. 2, unoptimized application 220 represents a version of optimization application 215 that is not optimized in accordance with the embodiments described herein. Thus, although unoptimized application 220 also includes unused space, store relevant data, user data, and code and logic portions, unoptimized application 220 uses a larger portion of memory for the storage of store relevant data than optimized application 215.

This is because, in accordance with the embodiments described herein, store relevant data 215.2 may include data representing store-relevant materials for a single store area, while the corresponding store relevant data for unoptimized application 220 represents store-relevant materials for an entire retail store (or several stores). For example, because a predicted shopping path may be calculated based upon the information transmitted from portable computing device 200 to one or more back-end components, the one or more back-end components may use this data to calculate a predicted shopping path for the user's next visit to the same retail store.

Using this predicted shopping path, portable computing device 200 may determine, from the user's current location within the retail store, the most likely area the user will next visit along the shopping path. Once this area is identified, portable computing device 200 may download or pre-fetch store-relevant materials associated with only this identified area. Furthermore, as a user leaves a particular area in the retail store, portable computing device 200 may purge the data associated with the store-relevant materials for the last location, thus allowing store relevant data 215.2 to be reduced in size, as data for store-relevant materials associated with a single store area within the retail store is all that is required to be stored at a given time.

Code and logic 215.4 may represent executable instructions, algorithms, and/or code that facilitate the functions performed by optimized application 215. For example, as shown in FIG. 2, code and logic 215.4 includes a shopping path module 215.5 and a store relevant data loading module 215.6. The respective function of each of these modules is further discussed below.

Shopping path module 215.5 may include executable instructions, algorithms, and/or code to facilitate gathering data which, once transmitted to one or more back-end components, may be used by the one or more back-end components to calculate a predicted shopping path. Thus, shopping path module 215.5 may work in conjunction with one or more processors 202, communication unit 204, and/or location acquisition unit 210 to gather any suitable type of information that may be used in the calculation of a predicted shopping path and transmit this information to one or more back-end components.

In various embodiments, shopping path module 215.5 may include instructions that facilitate portable computing device 200 transmitting its location in accordance with any suitable techniques. For example, portable computing device 200 may transmit its location as geographic location data (e.g., geographic coordinates) obtained via location acquisition unit 210 continuously or in accordance with any suitable schedule (e.g., once every 15 seconds, once every 30 seconds, etc.). These embodiments may be particularly useful, for example, in determining whether portable computing device has entered a particular retail store location based upon a comparison of the geographic location data to one or more geofences (e.g., geofence 105, as shown in FIG. 1).

In some embodiments, the determination of whether portable computing device 200 has crossed a geofence and therefore entered a retail store may be determined locally via portable computing device 200. In accordance with such embodiments, this may be implemented via memory unit 212 storing geofence data associated with one or more retail store locations, and a unique identifier correlating each geofence to each retail store, such as a store identification number, for example. Shopping path module 215.5 may include instructions to facilitate the comparison of geographic location data to each one of these geofences stored in memory unit 212.

Based on this comparison, a determination may be made whether portable computing device 200 has entered a specific retail store location. In such a case, the unique identifier associated with the retail store location may be transmitted to one or more back-end components along with any other suitable data such as a timestamp, information identifying the user of portable computing device 200, a date and time when the geofence was crossed (both entering and exiting the retail store, such that a duration of the visit may be determined), or any other suitable information that may be used by one or more back-end components to calculate a predicted shopping path.

In other embodiments, the determination of whether portable computing device 200 has entered a retail store may be determined at one or more back-end components (e.g., one or more back-end components 112, as shown in FIG. 1). For example, portable computing device 200 may transmit its location to one or more back-end components, which may store geofence data and a correlation of the geofence coordinates for each respective geofence to particular retail stores. The one or more back-end components may then compare the received location data to the geofence data to determine whether a user associated with portable computing device 200 has visited a retail store, which particular retail store was visited, and for how long.

Shopping path module 215.5 may additionally include instructions to continue to facilitate the continued tracking of the location of portable computing device 200 once inside of a retail store location. For example, an aforementioned geofence perimeter may be initially used to allow for the determination of whether portable computing device has entered a retail store location, such as by crossing geofence 105 and entering retail store 101, for example. Once inside of retail store 101, portable computing device 200 may continue to track its location and/or transmit data indicative of changes in the location of portable computing device 200 such that predicted shopping path 111 may be calculated.

In various embodiments, the location of portable computing device 200 may be tracked inside of a retail store location in accordance with any suitable techniques that facilitate a level of location tracking granularity such that a user's path along various retail store areas may be clearly identified. In some embodiments, portable computing device 200 may use a similar or identical location tracking technique outside and inside the retail store. But in other embodiments, portable computing device 200 may switch to a different location tracking technique based upon whether portable computing device 200 is inside of a retail store or outside of a retail store. Again, the determination of whether portable computing device 200 is outside or inside of a retail store may be made locally via portable computing device 200 or via a notification transmitted by one or more backend computing devices and received at portable computing device 200.

For example, location acquisition unit 210 may periodically calculate the location of portable computing device 200 via satellite communications in accordance with a GNSS, resulting in the calculation of geographic coordinates. As discussed above, these geographic coordinates may allow for the determination, via portable computing device 200 or one or more back-end components, of whether portable computing device 200 has crossed geofence 105. Continuing this example, upon crossing geofence 105, location acquisition unit 210 may continue to calculate geographic coordinates, but these geographic coordinates may then be referenced to an overlay of retail store 101 instead of one or more geofences.

In other words, as discussed above, portable computing device 200 and/or one or more back-end components may determine whether portable computing device 200 has crossed geofence 105 and identify the particular retail store 101 that is associated with geofence 105. Once retail store 101 is identified in this way, embodiments include portable computing device 200 and/or one or more back-end components correlating retail store 101 to an overlay of geographic coordinates that detail the various areas within retail store 101. This overlay may be configured as any suitable type of coordinate identification system that discerns different areas of the retail store in any suitable manner. For example, the overlay may include a range of coordinates with a sufficiently fine granularity such that the tracked location (and thus the path) of portable computing 200 may be associated with the various areas 101.1-101.6 while moving throughout retail store 101 during a shopping visit, as shown in FIG. 1.

To provide another example with continued reference to FIG. 1, once it is determined that portable computing device 200 has crossed geofence 105 and/or entered retail store 101, portable computing device 200 may switch the manner in which location tracking is performed. That is, portable computing device 200 may use GNSS location tracking while outside of retail store 101, but then switch to an alternate means of location tracking once inside of retail store 101. These embodiments may be particularly useful, for example, when satellite signal reception is poor inside of retail store 101 and/or when the accuracy of a GNSS system does not provide adequate granularity to properly identify a user's path with respect to the different store areas 101.1-101.6.

For example, portable computing device 200 may implement any suitable techniques in which the location of portable computing device 200 may be correlated to areas within the retail store while a user walks through the store. In an embodiment, portable computing device 200 may implement a system whereby uniquely identifiable data may be correlated to a known location of a source associated with the identifiable data.

To provide an illustrative example with continued reference to FIG. 1, various communications devices may be positioned at the various areas 101.1-101.6 throughout retail store 101. These communication devices are not shown in FIG. 1 for purposes of brevity, but may be implemented as any suitable communication device configured to periodically transmit data that uniquely identifies each respective communication device.

For example, the communication devices associated with each respective store area 101.1-101.6 may be implemented as any suitable wireless communication device configured to transmit one or more signals in accordance with any suitable communication protocols and/or recurring schedule, such as once per every 10 seconds, once per 30 seconds, etc. In some embodiments, the communication devices may be implemented as "Beacons," which have been developed by multiple wireless hardware manufacturers (e.g. Qualcomm, Cambridge Silicon Radio, etc.) If implemented as Beacons, each communication device may be configured to transmit a universally unique identifier (UUID) and data representative of calibrated receive power information in accordance with one or more standards utilized by Beacon devices. For example, the communication devices may transmit data in accordance with a BLUETOOTH Low Energy (BLE) protocol, which implements the BLUETOOTH 4.0 specification at the time of this writing.

In embodiments in which Beacons are positioned throughout a retail store and used for location tracking within the store, one or more processors 202 may execute instructions stored in shopping path module 215.1 to estimate the proximity of portable computing device 200 to each respective Beacon. For example, portable computing device 200 may compare calibrated receive power information received from a Beacon's transmitted signal to the received signal strength indicator (RSSI) associated with that particular signal and, using this ratio, estimate its proximity to the transmitting Beacon.

Embodiments include portable computing device 200 transmitting ranging data indicative of the proximity of portable computing device 200 to each communication device within the store, and thus the proximity of portable computing device 200 to each store area associated with each respective communication device. This ranging data may also be transmitted with one or more additional parameters, such as the identifier associated with each communication device, a timestamp, and/or other indication correlating how long portable computing device 200 is positioned at each range.

For example, in accordance with the current Beacon standard as of this writing, portable computing device 200 may compare the RSSI value of a received signal transmitted by a proximate communication device located at store area 101.2 to the calibrated power value transmitted by that same communication device. Portable computing device 200 may use this ratio to calculate ranging data, such as an immediate range (e.g., one to two inches), a near range (3 to 6 feet), and a far range (greater than 30 feet).

Portable computing device 200 may be configured to receive signals concurrently from multiple communication devices as a user walks through the retail store, and multiple communication devices may be positioned at each store area in a strategic manner to assist in path calculation. For example, assume that a communication device (e.g., a Beacon) is located at each of locations A1, A2, B1, and B2, as shown in FIG. 1. Further assume that during a user's store visit the user follows the same path as indicated by predicted shopping path 111. As the user follows this path, portable computing device 200 may transmit data to one or more backend computing devices indicating that over a span of T seconds, the range between portable computing device 200 and each of locations A1 and B1 decreased while the range between portable computing device 200 and each of locations A2 and B2 increased. One or more backend computing devices 112 may receive this data and, by correlating the signal ranges over time to the location of each identified communication device within retail store 101, calculate the portion of user's path walking between areas 101.1 and 101.2 towards area 101.3, as shown in FIG. 1. This process may then be repeated as portable computing device 200 moves throughout retail store 101 to calculate the user's entire path during a single store visit, which may be used to calculate the predicted shopping path 111 for future visits and/or the user's next likely location. These calculations are discussed in further detail below.

In various embodiments, portable computing device 200 may be configured to detect its proximity to each of the various communications devices using any suitable proximity detection method. For example, proximity detection may be accomplished using any suitable known ranging methods, such as those described in accordance with the Beacon standard discussed above, techniques implementing signal attenuation measurements, signal strength measurements, the use of propagation time of arrival (ToA) and time of departure (ToD) timestamps, etc.

In yet additional embodiments, portable computing device 200 may be configured to detect its proximity to other identifiable devices located throughout retail store 101 using other communication techniques outside of traditional communication bands. For example, portable computing device 200 may process unique sounds that may be emitted from various devices positioned throughout retail store 101 and/or directed to certain areas of retail store 101, analyze light patterns that may be emitted from various devices positioned throughout retail store 101 and/or directed to certain areas of retail store 101, etc. Of course, to the extent that specific hardware components may be needed to receive, analyze, and/or process signals, sounds, lights, etc., outside of traditional communication bands, portable computing device 200 may be implemented with such components and shopping path module 215.1 may include instructions to facilitate such implementations. These additional components are not shown in FIG. 2 for purposes of brevity.

In some embodiments, GNSS tracking may not be needed to determine a user's path during a store visit. For example, the entryway of retail store 101 may be associated with a communication device or other unique identifier in the same manner as one or more areas 101.1-101.6. In such a scenario, portable computing device 200 need not rely on GNSS tracking to determine that portable computing device 200 has entered retail store 101, instead making this determination once portable computing device 200 is within a threshold range of the entryway, as discussed above with respect to the various techniques in which portable computing device 200 may determine its location with reference to areas 101.1-101.6.

Store relevant data loading module 215.6 may include executable instructions, algorithms, and/or code to facilitate determining when to purge old data stored in store relevant data 215.2 and/or when to pre-fetch new data to be stored in store relevant data 215.2. To do so, one or more processors 202 may execute instructions stored in store relevant data loading module 215.6 to monitor the current location of portable computing device 200 and/or transmit the current location of portable computing device 200 to one or more back-end components (which may send a suitable signal to portable computing device 200 indicating when to do so). Thus, store relevant data loading module 215.6 may work in conjunction with one or more processors 202, communication unit 204, location acquisition unit 210, and/or shopping path module 215.5 to facilitate these functions.

In various embodiments, store relevant data loading module 215.6 may include instructions that, when executed by one or more processors 202, cause portable computing device to perform such acts locally and/or in combination with one or more back-end components. For example, in locally executed embodiments, portable computing device 200 may use the current location of portable computing device to predict the next location of portable computing device 200 having the statistically highest probability of being visited by the user.

However, in embodiments in which portable computing device 200 works in conjunction with one or more back-end components 112, portable computing device 200 may transmit its current location to the one or more back-end components 112. The one or more back-end components 112 may in turn use the current location of portable computing device to predict the next location of portable computing device 200 having the statistically highest probability of being visited by the user.

Regardless of how the most likely next location of portable computing device 200 is calculated, embodiments include portable computing device 200 updating the data stored in store relevant data 215.2 based upon this location. For example, referring back to FIG. 1, once portable computing device 200 enters retail store 101, back-end components may correlate the location of portable computing device 200 to a particular predictive modeling algorithm associated with predicted shopping path 111, which is associated with retail store 101. Once this correlation has been made, store relevant data associated with the first store area 101.1 may be pre-fetched by portable computing device 200 and/or pushed to portable computing device 200 from the one or more back-end components 112 and stored in store relevant data 215.2. Upon portable computing device 200 being located within a threshold distance of the first store area 101.1, portable computing device 200 may display these already downloaded store-relevant materials.

Continuing this example, assuming portable computing device 200 continues to follow along the same path as predicted shopping path 111, the location of portable computing device 200 may become further away from the first store area 101.1. Once portable computing device 200 exceeds a threshold range from first store area 101.1, portable computing device 200 may purge the data stored in store relevant data 215.2. Once purged, store relevant data associated with the second store area 101.2 may be pre-fetched by portable computing device 200 and/or pushed to portable computing device 200 from the one or more back-end components 112 and stored in the store relevant data 215.2. Upon portable computing device 200 being located within a threshold distance of the second store area 101.2, portable computing device 200 may display the store-relevant materials associated with the second store area 101.2. The process or purging and pre-fetching data may continue in this manner until the user has completed her store visit and exited retail store 101.

In an embodiment, the functionalities associated with both shopping path module 215.1 and store relevant data loading module 215.6 may operate concurrently. That is, as a user visits a store and store relevant data is pre-fetched and purged, portable computing device 200 may also collect and transmit new information that may be used for the calculation of a new, updated predicted shopping path. In this way, predicted shopping path 111 may change over time in the event that the user does not actually follow the path corresponding to predicted shopping path 111. The details associated with updating the predicted shopping path are further discussed below.

Figure 3:
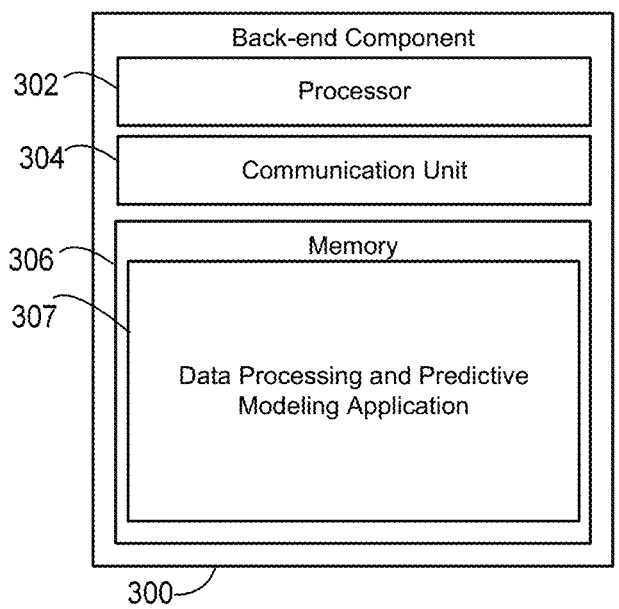
FIG. 3 is a block diagram of an exemplary back-end component 300, according to an embodiment.

FIG. 3 is a block diagram of an exemplary back-end component 300, according to an embodiment. In an embodiment, back-end component 300 may be an implementation of one or more back-end components 112, for example, as shown in FIG. 1. Back-end component 300 may include one or more processors 302, a communication unit 304, and a memory unit 306.

One or more processors 302, communication unit 304, and memory unit 306 may be substantially similar implementations of, and perform substantially similar functions as, one or more processors 202, communication unit 204, and memory unit 210, respectively, as shown in FIG. 2. Therefore, only differences between these components will be further discussed herein.

Data processing and predictive modeling application 307 is a portion of memory unit 306 configured to store instructions, that when executed by one or more processors 302, cause one or more processors 302 to perform various acts in accordance with the applicable embodiments as described herein. For example, in various embodiments, instructions stored in data processing and predictive modeling application 307 may facilitate one or more processors 302 performing functions such as receiving any suitable type of information used in the calculation of predicted shopping paths (e.g., user information, information associated with the user's portable computing device, etc.), determining the current location of a portable computing device, determining whether a portable computing device has entered a particular store, identifying a retail store, accessing geofence data and making comparisons with the current location of the portable computing device, receiving data from a portable computing device such as ranging data and/or geographic coordinates indicative of the location of the portable computing device, etc.

Upon execution of data processing and predictive modeling application 307, one or more processors 302 may match received data to user information stored in one or more databases (e.g., database 112.2, as shown in FIG. 1). For example, one or more processors 202 may compare any portion of user information (e.g., a logon username) received from the user's portable computing device to data stored in one or more databases to correlate the user information to that user's particular profile. In this way, data processing and predictive modeling application 307 may facilitate the collection of different types of data used to calculate a predicted shopping path for a particular user and store this data as part of a profile associated with that user.

Furthermore, upon execution of data processing and predictive modeling application 307, one or more processors 302 may determine the content of appropriate relevant store data to push to a portable computing device and/or to make available for download from a portable computing device. Additionally or alternatively, predictive modeling application 307 may facilitate determining when to make this data available. For example, back-end component 300 may determine the content of store-relevant materials such as promotional materials, notifications, informational notices, messages, etc., associated with each retail store area for multiple stores.

Continuing this example, back-end component 300 may also take various actions based upon the current received location (or calculated location) of a portable computing device. For example, back-end component 300 may determine when to send an appropriate indication to a portable computing device to purge data and/or when to send an appropriate indication to a portable computing device to pre-fetch new data. To provide another example, back-end component 300 may determine when to push store relevant data to a portable computing device.

Communication unit 304 may be configured as any suitable combination of hardware and/or software to facilitate the retrieval and/or storage of all relevant data used to calculate predicted shopping paths, to access and/or modify user profile data stored in one or more databases, to retrieve and/or transmit store relevant data, etc. In various embodiments, communication unit 304 may be configured to facilitate data communications between back-end component 300 and one or more other back-end components, communication devices, and/or networks in accordance with any suitable number and/or type of communication protocols, which may be the same communication protocols as one another or different communication protocols based upon the particular network component and/or network that back-end component 300 is communicating.

Figure 4:
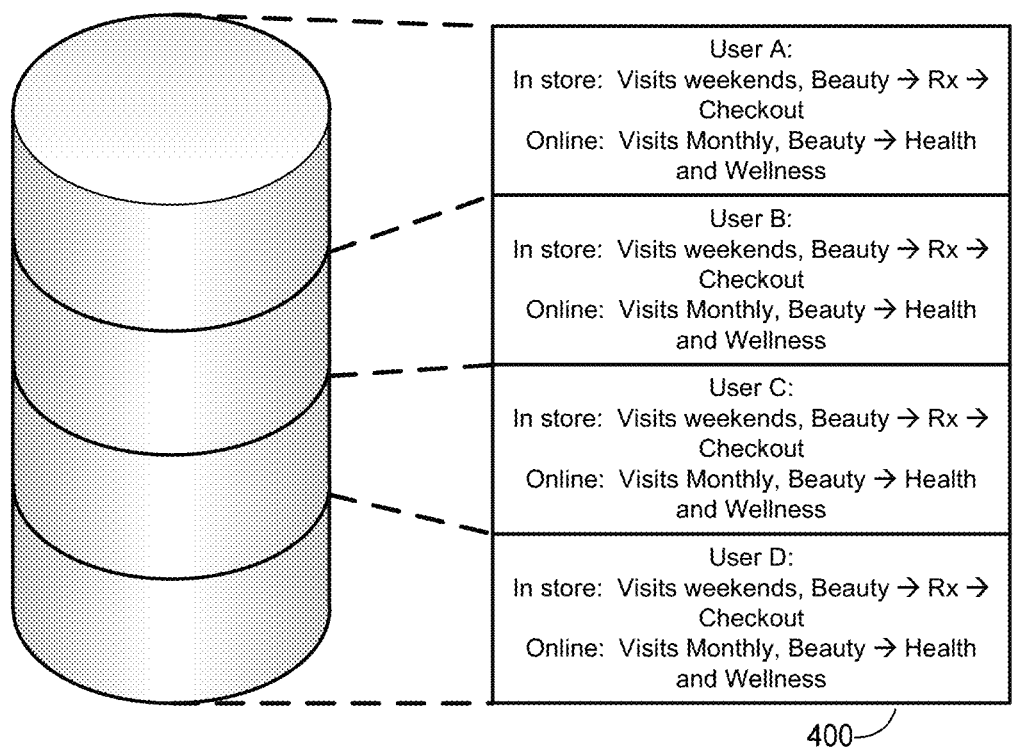
FIG. 4 is a block diagram of an exemplary set of user profiles 400 used to calculate predicted shopping paths, according to an embodiment.

FIG. 4 is a block diagram of an exemplary set of user profiles 400 used to calculate predicted shopping paths, according to an embodiment. In an embodiment, user profiles 400 may be stored in any suitable location, such as one or more back-end components 112, as shown in FIG. 4. For example, user profiles 400 may be stored in one or more databases 112.2.

As shown in FIG. 4, user profiles 400 correspond to 4 different users A-D, although embodiments include any suitable number of user profiles 400 being stored in one or more back-end components. In an embodiment, each user's profile may include specific unique information that may be used to later correlate data received via one or more back-end components to a user's particular profile. For example, each of users A-D may be identified by their logon usernames.

User profiles 400 represent a history of shopping and/or purchasing behavior for each user as well as other information that may be relevant to calculate a predicted shopping path for each user A-D. For example, as each user A-D visits one or more retail stores, one or more back-end components may receive location data from the portable computing device associated with each of users A-D, as previously discussed. From this location data, a logged history of when each user visited each store and the user's path while shopping in each store may be determined by the one or more back-end components and stored as part of that user's profile. Using the user profile data, the calculated predicted shopping path for each user may be calculated on a per-user, per-store basis, which is further discussed below.

Furthermore, other data may be stored in or otherwise associated with each user's profile that may be useful in calculating that user's predicted shopping path or for other uses. To provide an illustrative example, user profiles 400 indicate that user A visits retail stores mostly on the weekends and, during at least one of those visits, user A followed a path starting with the beauty department, moved the pharmacy, and then left the store. Although one shopping path is shown in FIG. 4 for user A, embodiments include the user profiles including any suitable number of store visits, for any suitable number of stores, and for any suitable number of users.

Similarly, online shopping behaviors may be tracked and stored as part of each user profile. This may be determined, for example, by tracking the navigational links, internet protocol (IP) addresses, urls, or other identifiable portions of the retailer's web-based or other suitable application that the user may use for shopping in addition to, or as an alternative to, visiting brick-and-mortar retail store locations. The user's navigation may be identified and tracked, for example, by correlating user logon identification to that user's online behavior. To provide an illustrative example, user profiles 400 indicate that user A shops online by visiting the beauty portion of the online retail application before navigating to the health and wellness portion of the online retail application.

In various embodiments, each user's in store and/or retail shopping behavior may be analyzed to not only calculate predicted shopping paths, but to provide additional data that may be useful for the retailer. For example, over several store visits, a majority of user A's in-store visits may be found to occur on weekends (e.g., more than 75% of visits in the last 90 days). In addition, over several online shopping sessions, it may be determined that user A's online activity occurs once a month.

To provide another example, the frequency of visits and when the visits most commonly occur may be useful in determining the content of store-relevant materials to present to the user, or whether users in particular regions prefer online shopping versus in-store shopping. To provide additional examples, the frequency of visits may be useful in identifying areas that could potentially have a high demand for a new retail store.

Figure 5:
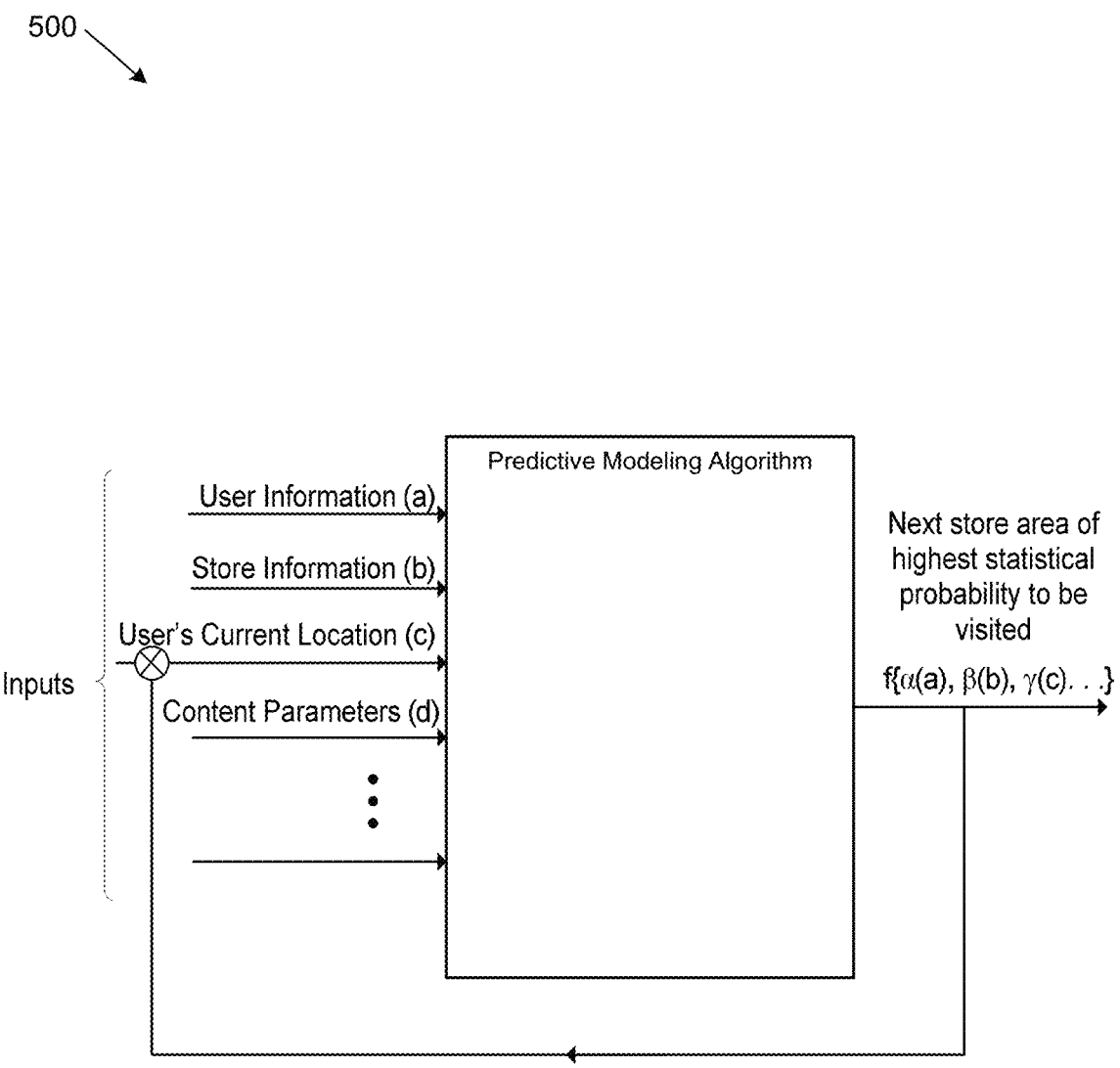
FIG. 5 is a block diagram illustrating the inputs and outputs of an exemplary predicative modeling algorithm 500, according to an embodiment.

FIG. 5 is a block diagram illustrating the inputs and outputs of an exemplary predicative modeling algorithm 500, according to an embodiment. In an embodiment, predicative modeling algorithm 500 is an example of an algorithm implemented by one or more back-end components to calculate one or more locations along a predicted shopping path. For example, predicative modeling algorithm 500 may be part of the instructions stored in data processing and predictive modeling application 307, which is executed by one or more processors 302, as shown in FIG. 3. FIG. 5 indicates four different types of inputs, three of which are used to determine the next store area of highest statistical probability to be visited by a user. However, embodiments include predicative modeling algorithm 500 utilizing any suitable number and/or type of inputs to facilitate this determination.

In an embodiment, predicative modeling algorithm 500 may continuously and dynamically collect additional information over time to refine the accuracy of the calculated next likely location. In other words, as the user continues to visit a retail store, additional data may be used to change the predicted shopping path such that the likelihood of a correct prediction of the next store location increases. In this way, the calculated predicted shopping path may be viewed as calculating an order in which a user has the highest statistical probability of visiting a plurality of shopping areas within a store.

To do so, predicative modeling algorithm 500 may use any suitable number and/or type of data. Again, a predicted shopping path may be calculated and updated dynamically or represent a predetermined path, based on the availability of different types of input to predicative modeling algorithm 500. For example, when a history of previous store visits is available for a particular user and a particular store, then this information may be leveraged to dynamically calculate the user's most likely next location. For example, as shown in FIG. 5, the user information (a) and the store information (b) may be included in a user's profile. The user information (a) may include, for example, demographics related to the user such as age, income, etc. Furthermore, user information (a) may also include a history of previous user shopping paths for a particular store, when such data is available.

Continuing this example, input store information (b) may include data that identifies the store to which the other various inputs correspond. This may be determined, for example, via geofence referencing and/or other data received from the portable computing device identifying that the user has started a store visit by entering a boundary or threshold so indicating.

Further continuing this example, the input user's current location (c) may include data indicative of the user's current location. This may include, for example, an indication of the user's specific location within a store associated with the store information (b), which may be utilized to determine the specific area in the store the user is currently located. This may also include, for example, an indication of the user's location outside of the store such that a determination may be made that the user has just started a store visit.

In an embodiment, predicative modeling algorithm 500 may suitably weight each of these inputs as part of a weighting function, $f$. For example, as shown in FIG. 5, input (a), the user information, may be weighted with a first weight $\alpha$, while input (b), the store information, is weighted with a second weight $\beta$ and input (c), the user's current location, is weighted with a third weight $\gamma$. The weights $\alpha$, $\beta$, and $\gamma$ may constitute any suitable respective values that may be implemented depending on the type of weighting function that is implemented.

For example, weights $\alpha$, $\beta$, and $\gamma$ may correspond to constant values ranging between 0 and 1, which may be increased from 0 to 1 to indicate a greater contribution to the calculation of the user's most likely next store area to be visited. To provide an illustrative example with continued reference to FIGS. 1 and 4, assume that user 103, as shown in FIG. 1, has a user profile associated with user A, as shown in FIG. 4. Based upon the tracked location of user 103 from the past several store trips (e.g., the last 8 trips), assume that the user followed the same path shown in predicted shopping path 111 of FIG. 1 for 75% of these trips (e.g., 6 of the last 8 store visits within the last 6 months). Therefore, for a given store visit, the user's current location within store 101 may be considered as a good indicator of the user's most likely next location when taken in accordance with predicted shopping path 111.

Thus, when tracked location history is available, the weight $\gamma$ may be set to a higher value (e.g., 0.5) than weights $\alpha$ and $\beta$ (e.g., 0.3 and 0.2, respectively) as part of the weighting function $f$. By doing so, the weighted function places greater statistical emphasis on data that is more likely to yield the user's next location. That is, the user's current location within a retail store may function as a better predictor of where that user is likely to go next when a user has behaved in similar ways in the past from that same location.

In various embodiments, the weights may be updated and/or adjusted at any suitable time as additional data is collected. For example, it may be found after several store visits that for some users, age or other demographic factors may be a better indicator of the next store area than the user's previous history and/or current location. In such a case, the weight $\alpha$ may be set to a higher value than weights $\beta$ and $\gamma$.

To provide another example, some geographic regions may have a similar store layout that ensures most users visit these stores in a similar fashion. In other words, for some stores, regardless of other types of information, most users may tend to visit retail stores in a common region along similar shopping paths. In such a case, the weight $\beta$ may be set to a higher value than weights $\alpha$ and $\gamma$.

In some embodiments, there may be little or no data available for a particular user. For example, a new user may install the retailer's application on his portable computing device but not generate a user profile. To provide another example, a new user may have a user profile but the profile may be new and/or have little data regarding the user and/or previous shopping paths.

In such scenarios, embodiments include utilizing other data received from the portable computing device to try to determine which predetermined shopping path may be a best match for a particular user. For example, a new user may not be associated with a user profile, but several "guest" profiles may be created in accordance with various metrics for unknown users, which may include, for example, information associated with the portable computing device and/or information associated with the store. Information associated with the portable computing device may include, for example, a unique portable computing device identifier (e.g., a MAC ID), an operating system associated with the portable computing device, a model associated with portable computing device, etc. Furthermore, information associated with the store may include, for example, a geographic region of the store and/or a store layout.

Thus, embodiments include matching an unknown user to predetermined predicted shopping paths using data that is available. Continuing the example above with reference to the weighting function $f$, predicative modeling algorithm 500 may utilize the predetermined shopping path and weight the user's information less when unavailable as compared to other data that is more available and/or considered a more reliable indicator of whether the user will actually follow the predetermined shopping path.

Regardless of how the user's next most likely location may be determined, embodiments include determining whether the user actually followed this path and, if not, potentially adjusting the weights to improve upon future accuracy. To provide an illustrative example, assume that user 102 visits retail store 101 but follows predicted shopping path 111 in the opposite direction, i.e., user 102 first walks from area 101.4 at location D1 towards area 101.3 at location C1.

In such a case, the user's current location (e.g., D1) would be different than the area in retail store 101 calculated as being the statistically most likely to be visited first (e.g., A1). Therefore, embodiments include predicative modeling algorithm 500 adjusting one or more weights used by the weighting function $f$ in accordance with this difference. In other words, once the user deviates from the initially calculated predicted shopping path 111, the weights may be adjusted to take into account this deviation, as it may now be less likely that the user will visit location A2 after being at location D1 and more likely that the user will now visit location C1 instead.

Thus, predicative modeling algorithm 500 may determine whether an actual next shopping area visited by the user matches the calculated next shopping area which the user had the highest statistical probability of visiting next during a store visit. And when the actual next shopping area is different than the calculated next shopping area, predicative modeling algorithm 500 may then adjust the weights of the weighted function $f$ such that subsequently calculated next shopping areas that apply the adjusted weights have a greater probability of being correct as compared to applying the weighted function before the weights have been adjusted.

Again, predicative modeling algorithm 500 may utilize any suitable number and/or type of inputs to calculate the next store area of highest statistical probability of being visited by a user. For example, in some embodiments, the user's online behavior may be used as inputs to predicative modeling algorithm 500. These embodiments may be particularly useful, for example, when little tracked location history data is available for a particular user. For example, in such instances the online data may be used in place of the tracked location history data such that physical departments in the store may be substituted for their online equivalents.

Furthermore, predicative modeling algorithm 500 may utilize one or more inputs to calculate the content of materials in addition to the user's next likely location within the retail store. For example, the retailer may provide promotional materials associated with each area in a retail store, which may be accessed by one or more back-end components such that the data used by the portable computing device is relevant to that area.

The data sent to the portable computing device, however, may be dependent on factors in addition to location. For example, predicative modeling algorithm 500 may provide specific messages or notifications using the input content parameters (d). The content parameters may specify, for example, data representing content (or where such content may be accessible by the one or more back-end components). This may include, for example, seasonal messages, notifications pertaining to specific events and/or information, promotions, etc. For example, content parameters (d) may specify a notification informing the user at a particular retail store of flu vaccinations or other over-the-counter medications during flu season. To provide another example, input content parameters (d) may specify store-relevant materials associated with specific holidays or specific stores, regions, etc., and may help facilitate more relevant and targeted advertising.

Figure 6:
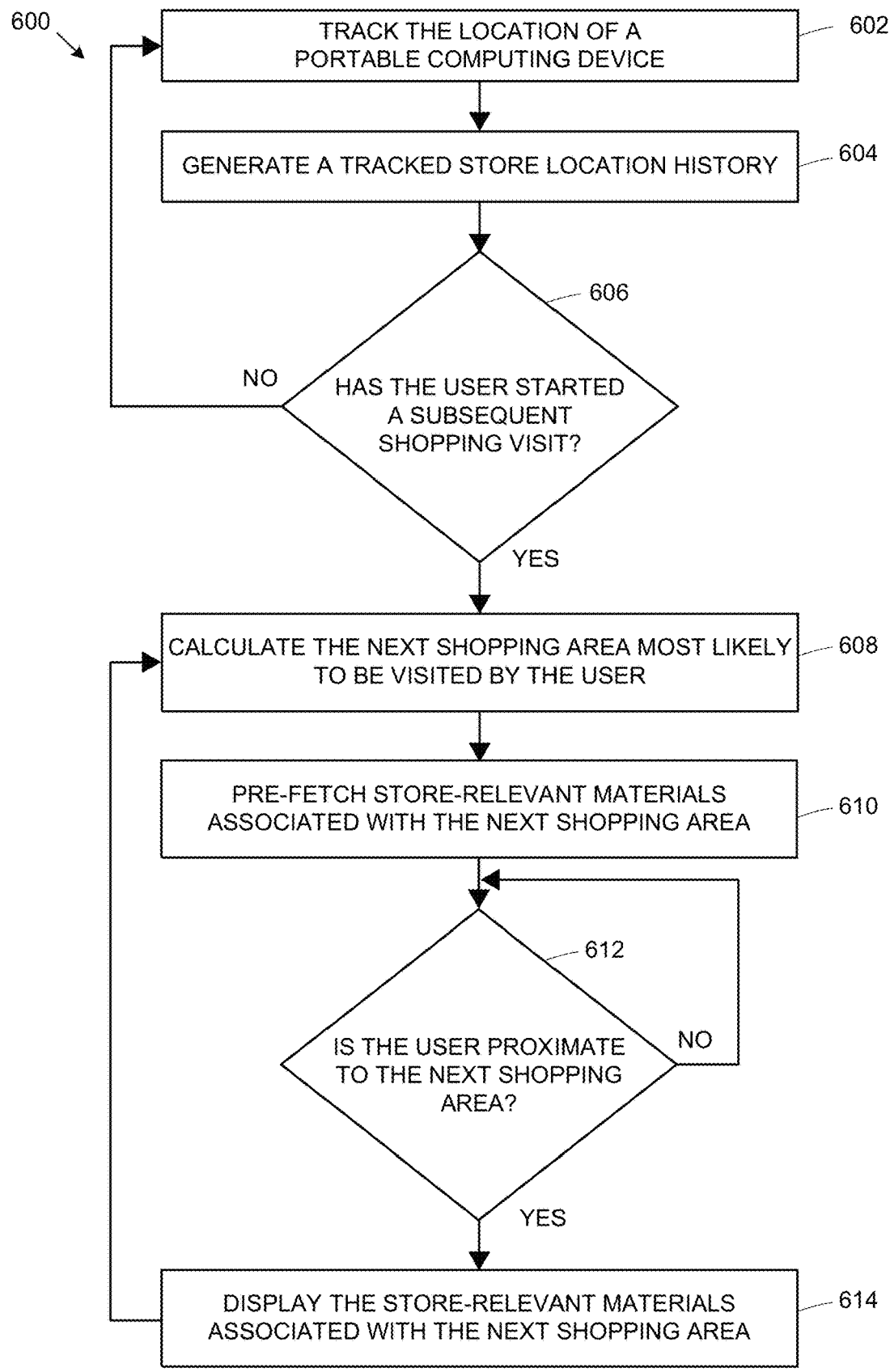
FIG. 6 illustrates a method flow 600, according to an embodiment.

FIG. 6 illustrates a method flow 600, according to an embodiment. In an embodiment, one or more portions of method 600 (or the entire method 600) may be implemented by any suitable device, and one or more portions of method 600 may be performed by more than one suitable device in combination with one another. For example, one or more portions of method 600 may be performed by portable computing device 102 and/or one or more back-end components 112, as shown in FIG. 1. In an embodiment, method 600 may be performed by any suitable combination of one or more processors, applications, algorithms, and/or routines. For example, method 600 may be performed via or more processors 202 executing instructions stored in optimized application 215 in conjunction with location data input generated via location acquisition unit 210. To provide another example, method 600 may be performed via or more processors 302 executing instructions stored in data processing and predictive modeling application 307 in conjunction with data received from a portable computing device via communication unit 304.

Method 600 may start when one or more processors track the location of a portable computing device (block 602). In various embodiments, the location of the portable computing device may be tracked locally via the portable computing device (e.g., portable computing device 102, as shown in FIG. 1) and/or tracked via one or more back-end components (e.g., one or more back-end components 112, as shown in FIG. 1) (block 602). The location tracking may be performed in accordance with any suitable techniques to identify the location of the portable computing device inside and outside of a retail store.

Method 600 may include one or more processors generating a tracked store location history (block 604) of the portable computing device. This may include, for example, one or more back-end components processing location data received from the portable computing device (block 602) and assembling this data into a user profile including an in store shopping path for each store visit (block 604).

Method 600 may include one or more processors determining whether the user has started a subsequent shopping visit (block 606). This may include, for example, one or more back-end components using location data received from the portable computing device (block 602) to determine whether the portable computing device has crossed a geofence boundary associated with a store's location (block 606). To provide another example, this may include, for example, one or more back-end components using location data received from the portable computing device (block 602) to determine whether the portable computing device is within a threshold range of a communication device that is associated with the store's entrance (block 606). If so, method 600 may continue (block 608). Otherwise, method 600 may revert back to continuing to track the location of the portable computing device (block 602) and generating a tracked store location history (block 604).

Method 600 may include one or more processors calculating the next shopping area most likely to be visited by the user (block 608). For example, this may include one or more back-end components using the tracked store location history (block 604), the current location of the portable computing device (block 602), and/or other data to determine the area within the store having the highest statistical probability of being next visited by the user (block 606). Again, this calculation may utilize a weighted function that weights each input received by the one or more back-end components, which may include data accessed from the user's profile (block 608).

Once the location of the next shopping area within the store has been calculated (block 608), method 600 includes one or more processors pre-fetching data associated with the store-relevant materials for that calculated location (block 610). In various embodiments, the pre-fetching may be initiated by a portable computing device (e.g., downloaded from one or more back-end components) or initiated by one or more back-end components (e.g., pushed to the portable computing device) (block 610).

Method 600 may include one or more processors determining whether the user is proximate to the next shopping area (block 612), which was previously calculated (block 608) and for which the store-relevant materials were pre-fetched (block 610). This determination may be made, for example, via any suitable location-tracking techniques (block 612). For example, this determination may be made in accordance with GNSS location determination techniques and/or Bluetooth-based determination techniques, as discussed herein (block 612).

In any event, the determination of whether the user is proximate to the next shopping area may be determined based upon a comparison of the location of the user's portable computing device to the known location of the next shopping area (block 612). For example, it may be determined that the user is proximate to the next shopping area when the user's portable computing device is within a threshold range of the next shopping area (block 612). If so, method 600 may continue (block 614). If not, then method 600 may revert back to continuing to determine whether the user is proximate to the next shopping area (block 612).

Method 600 may include one or more processors displaying the store-relevant materials associated with the next shopping area (block 614), which have already been pre-fetched (block 610). Again, these store-relevant materials may be relevant to a particular store area, location, and/or department.

Figure 7:
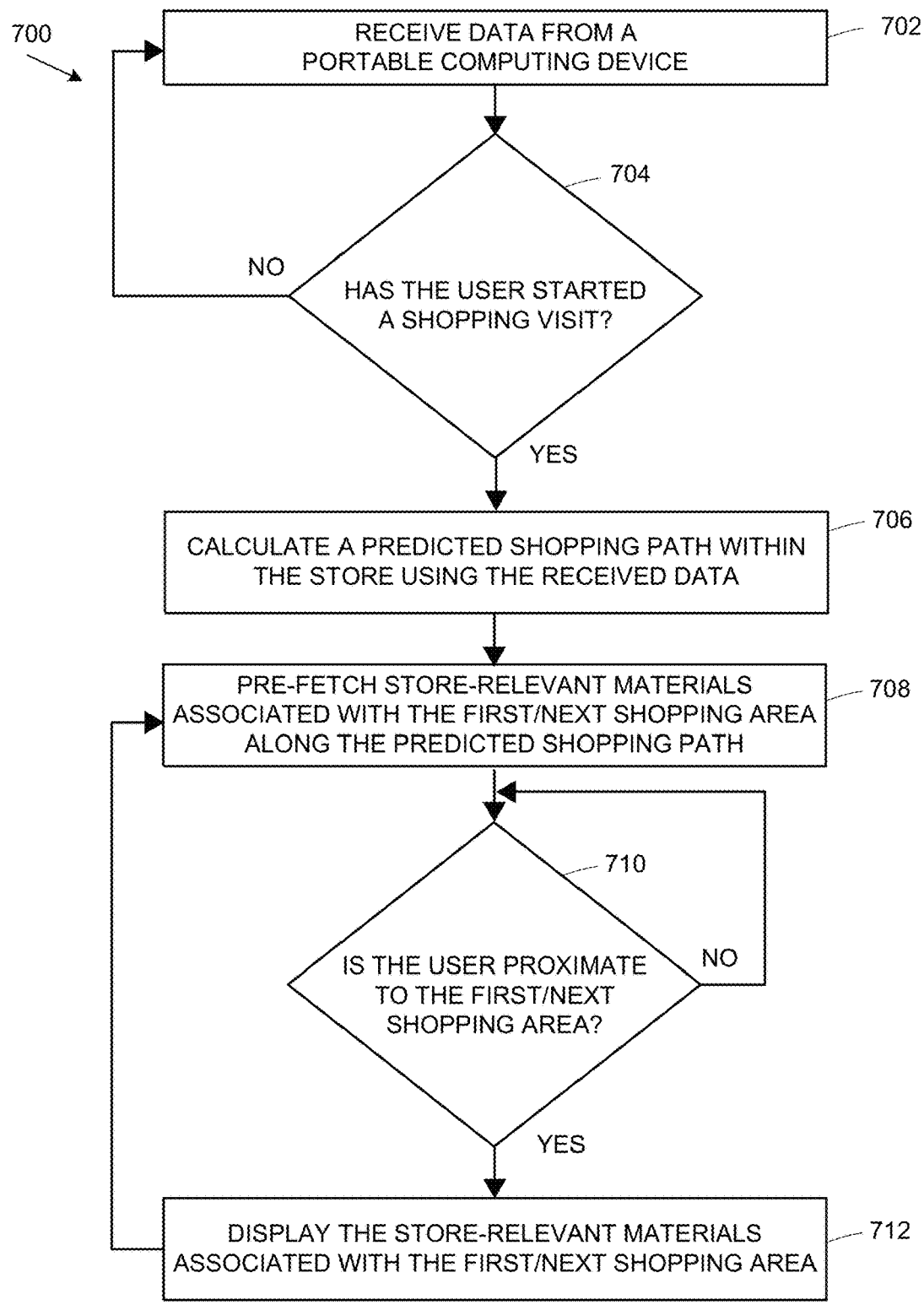
FIG. 7 illustrates a method flow 700, according to an embodiment.

FIG. 7 illustrates a method flow 700, according to an embodiment. In an embodiment, one or more portions of method 700 (or the entire method 700) may be implemented by any suitable device, and one or more portions of method 700 may be performed by more than one suitable device in combination with one another. For example, one or more portions of method 700 may be performed by portable computing device 102 and/or one or more back-end components 112, as shown in FIG. 1. In an embodiment, method 700 may be performed by any suitable combination of one or more processors, applications, algorithms, and/or routines. For example, method 700 may be performed via or more processors 202 executing instructions stored in optimized application 215 in conjunction with location data input generated via location acquisition unit 210. To provide another example, method 700 may be performed via or more processors 302 executing instructions stored in data processing and predictive modeling application 307 in conjunction with data received from a portable computing device via communication unit 304.

Method 700 may start when one or more processors receive data from a portable computing device (block 702). In various embodiments, the data received from the portable computing device may be any suitable type of data from which a predetermined shopping path may be calculated. For example, the data may represent location data transmitted by the portable computing device, information about the store where the portable computing device is located, and/or information about the portable computing device itself, as discussed above (block 702).

Method 700 may include one or more processors determining whether the user has started a shopping visit (block 704). This may include, for example, one or more back-end components using location data received from the portable computing device (block 702) to determine whether the portable computing device has crossed a geofence boundary associated with a store's location (block 704). To provide another example, this may include, for example, one or more back-end components using location data received from the portable computing device to determine whether the portable computing device is within a threshold range of a communication device that is associated with the store's entrance (block 704). If so, method 700 may continue (block 706). Otherwise, method 700 may revert back to continuing to receive data from the portable computing device (block 702).

Method 700 may include one or more processors calculating a predicted shopping path within the store that represents an order of store areas having the highest statistical probability of being visited by the user (block 706). For example, this may include one or more back-end components using data received from the portable computing device (block 702) to match the user to a predetermined shopping path (block 706). Again, this calculation may utilize a weighted function that weights each input received by the one or more back-end components, which may include data accessed from one or more guest profiles or other user profiles that are similar to the user (block 706).

Once the predicted shopping path has been calculated (block 706), method 700 includes one or more processors pre-fetching data associated with the store-relevant materials for the user's next likely location along the predicted shopping path (block 710). In various embodiments, the pre-fetching may be initiated by a portable computing device (e.g., downloaded from one or more back-end components) or initiated by one or more back-end components (e.g., pushed to the portable computing device) (block 710).

Method 700 may include one or more processors determining whether the user is proximate to the next shopping area along the shopping path (block 710), for which the store-relevant materials were pre-fetched (block 708). This determination may be made, for example, via any suitable location tracking techniques (block 710). For example, this determination may be made in accordance with GNSS location determination techniques and/or Bluetooth-based location determination techniques, as discussed herein.

In any event, the determination of whether the user is proximate to the next shopping area may be determined based upon a comparison of the location of the user's portable computing device to the known location of the next shopping area (block 710). For example, it may be determined that the user is proximate to the next shopping area when the user's portable computing device is within a threshold range of the next shopping area (block 710). If so, method 700 may continue (block 712). If not, then method 700 may revert back to continuing to determine whether the user is proximate to the next shopping area (block 710).

Method 700 may include one or more processors displaying the store-relevant materials associated with the next shopping area (block 712), which have already been pre-fetched (block 712). Again, these store-relevant materials may be relevant to a particular store area, location, and/or department.

Technical Advantages

The embodiments described herein may be implemented as part of one or more computer components such as a portable computing device and/or one or more back-end components. Furthermore, the embodiments described herein may be implemented as part of a computer network architecture that facilitates communications between various other devices and/or components. Thus, the embodiments described herein address and solve issues of a technical nature that are necessarily rooted in computer technology.

For instance, embodiments include analyzing user behavioral data and/or other sources of data to predict a user's most likely next location. Once this location is determined, the embodiments also allow for application optimization by purging data once a user leaves a particular store area and loading data relevant to the next store area. In doing so, the embodiments overcome issues associated with the memory size limits and reduce the amount of memory utilized by traditional applications. That is, because a user's actions cannot be predicted, retailer applications are typically unoptimized and require a much larger amount of memory space to provide a user with data when necessary or relevant. Without the improvements suggested herein, additional memory storage would be required, as the portable computing device would need to download additional data as needed. The former of these options results in a wasteful use of memory storage space, while the latter requires additional time for the relevant data to be downloaded.

Furthermore, the embodiments described herein function to improve the accuracy of a weighted function over time using the user's location (and other sources of data) as feedback. For example, by analyzing the user's next actual location when it is different than the predicted next location, weights of a weighting function may be adjusted to improve the statistical probability that subsequent predictions will be correct. Therefore, not only do the embodiments address computer-related issues regarding efficiency over the traditional amount of memory required by a retail application, but they also improve over time. By learning and improving over time, the embodiments address computer related issues that are related to efficiency metrics, such as consuming less power, for example.

Additionally, the embodiments described herein reduce the amount of data required for operation of an application while still displaying store-relevant materials to the user. In doing so, the embodiments address issues related to bandwidth usage. For example, by selectively pushing only relevant data to a portable computing device associated with the predicted most likely next location of the user, the amount of data required to maintain proper operation of the application is reduced. Therefore, the embodiments also help address issues related to network bandwidth usage and potentially alleviate network congestion.

ADDITIONAL CONSIDERATIONS

As used herein, the term "store," or "retail store" may include, for example, a single outlet or a plurality of outlets affiliated with one or more entities that are licensed or otherwise authorized to sell merchandise, to dispense prescribed pharmaceutical products such as drugs, medicaments, durable medical equipment, etc. The one or more entities may be located, for example, in geographic locations separate from one another, in different areas of the same city, or in different states, countries, etc. The retail stores may include, for example, one or more of a conventional retail store, space within a location operated by another commercial or not-for-profit entity (e.g., within a discount store, hospital, school, nursing home, etc.), an outlet in proximity with a warehouse or distribution center, a call-in pharmacy, a long-term care pharmacy, a workplace/on-site pharmacy, a specialty pharmacy, etc. The pharmacy may be commercial or not-for-profit, and may provide or vend other products in addition to the prescribed pharmaceutical products.

Furthermore, although the embodiments described herein use examples directed to the calculation of predicted shopping paths for a user inside of a physical retail store, the embodiments may be equally applicable to the calculation of any suitable user actions. For example, as discussed herein, each user's online shopping habits may be stored as part of a user profile, and this data may be used as input to a predictive modeling algorithm. Additionally or alternatively, the order in which a user has previously navigated different areas of an online retail application and/or the user's previous paths through a physical retail store may be used to predict the portions of a website that a user may visit next. Expanding the prediction of which portion of a web-based application that a user may visit next may have specific advantages directed to such implementations. For example, the application may pre-load advertisements or other relevant data so this data is ready once the user arrives at the next predicted portion of the online application.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

What is claimed is:

1. A method, comprising:
    tracking, by one or more processors, locations of a portable computing device associated with a user;
    generating, by the one or more processors, a tracked store location history from the locations of the portable computing device, the tracked store location history indicating the locations of the portable computing device within a store over one or more store visits;
    tracking, by the one or more processors, online shopping behaviors of the user;
    detecting, by the one or more processors, when the user has begun a subsequent store visit that occurs after the one or more store visits based on the tracked locations of the portable computing device;
    when the user begins the subsequent store visit, predicting, by the one or more processors, a first shopping area within the store that the user is predicted to enter based on (i) the tracked store location history, (ii) the tracked online shopping behaviors, and (iii) a current location of the portable computing device within the store during the subsequent store visit;
    in response to predicting the first shopping area within the store and prior to the portable computing device coming within a first threshold distance of the first shopping area, pushing to the portable computing device, by the one or more processors, store-relevant materials associated with the first shopping area within the store;
    in response to the store-relevant materials associated with the first shopping area being pushed and when the portable computing device becomes located less than the threshold distance from the first shopping area within the store during the subsequent store visit, causing, by the one or more processors, the portable computing device to present the pushed store-relevant materials associated with the first shopping area within the store to the user; and
    when the portable computing device becomes located at least a second threshold distance away from the first shopping area, purging the pushed store-relevant materials associated with the first shopping area from the portable computing device.

2. The method of claim 1, wherein detecting when the user begins the subsequent store visit comprises:
    detecting when the portable computing device enters a geofence boundary associated with the store's location.

3. The method of claim 1, wherein predicting the first shopping area within the store comprises:
    calculating a statistical probability using a weighted function that applies weights to one or more of: (i) user information, (ii) store information, or (iii) a current location of the portable computing device.

4. The method of claim 3, further comprising:
    determining, by the one or more processors, whether an actual next shopping area visited by the user matches the first shopping area; and
    when the actual next shopping area is different from the first shopping area, changing values assigned to the weights of the weighted function such that subsequent predictions of shopping areas within the store that a user is predicted to enter have an increased probability of being correct compared to applying the weighted function before the weights were adjusted.

5. The method of claim 1 further comprising:
    predicting, by the one or more processors, a second predicted next shopping area as a second shopping area within the store that the user is predicted to enter after visiting the first predicted next shopping area based on (i) the tracked store location history, (ii) the tracked online shopping behaviors, and (iii) a current location of the portable computing device within the store during the subsequent store visit; and
    in response to predicting the second shopping area within the store and prior to the portable computing device coming within the first threshold distance of the second shopping area, pushing to the portable computing device, by the one or more processors, store-relevant materials associated with the second shopping area within the store.

6. The method of claim 1, further comprising:
    detecting the portable computing device is located less than the first threshold distance from the first shopping area within the store during the subsequent store visit by detecting a signal transmitted by a communication device positioned at the first shopping area.

7. A system, comprising:
a portable computing device associated with a user, the portable computing device configured to transmit location data indicative of locations of the portable computing device; and
one or more back-end components configured to:
generate a tracked store location history using the transmitted location data, the tracked store location history indicating the locations of the portable computing device within a store over one or more store visits;
track online shopping behaviors of the user;
detect when the user begins a subsequent store visit that occurs after the one or more store visits using the transmitted location data;
when the user begins the subsequent store visit, predict a first shopping area within the store that the user is likely to visit next during the subsequent store visit based on (i) the tracked store location history, (ii) the tracked online shopping behaviors, and (iii) a current location of the portable computing device within the store during the subsequent store visit, wherein the first shopping area is from among a plurality of shopping areas in the store, each of the plurality of shopping areas being associated with respective store-relevant materials; and
in response to predicting the first shopping area within the store sending an indication to the portable computing device to pre-fetch store-relevant materials associated with the first shopping area,
wherein the portable computing device is further configured to
in response to the indication and prior to the portable computing device coming within a first threshold distance of the first shopping area pre-fetching store-relevant materials associated with the first shopping area,
in response to the store-relevant materials associated with the first shopping area being pre-fetched and the portable computing device coming within the first threshold distance of the first shopping area within the store during the subsequent store visit, present the store-relevant materials, and
when the portable computing device becomes located at least a second threshold distance away from the first shopping area, deleting the store-relevant materials associated with the first shopping area from the portable computing device.

8. The system of claim 7, wherein the one or more back-end components are further configured to detect when the user begins the subsequent store visit by detecting when the portable computing device crosses a geofence boundary associated with the store's location.

9. The system of claim 7, wherein the one or more back-end components are further configured to determine the first shopping area within the store using a weighted function that applies weights associated to one or more of: (i) user information, (ii) store information, or (iii) a current location of the portable computing device.

10. The system of claim 9, wherein the one or more back-end components are further configured to:
determine whether an actual next shopping area visited by the user matches the first shopping area; and
when the actual next shopping area is different from the first shopping area, adjust the weights of the weighted function such that subsequent predictions of shopping areas within the store that a user is likely to enter have an increased probability of being correct compared to applying the weighted function before the weights were adjusted.

11. The system of claim 7 wherein the one or more back-end components are further configured to:
determine a second shopping area within the store that the user is likely to enter after visiting the first shopping area based on (i) the tracked store location history, (ii) the tracked online shopping behaviors, and (iii) a current location of the portable computing device within the store during the subsequent store visit; and
in response to predicting the second shopping area within the store and prior to the portable computing device coming within the first threshold distance of the second shopping area, pushing to the portable computing device, by one or more processors, store-relevant materials associated with the second shopping area within the store.

12. The system of claim 7, wherein the one or more back-end components are further configured to detect that the portable computing device is located within the first threshold distance of the first shopping area within the store during the subsequent store visit by receiving data from the portable computing device indicating a distance between the portable computing device and a communication device that is positioned at the first shopping area.

13. A method, comprising:
accessing, by one or more processors, data representing (i) information associated with a portable computing device, and (ii) locations of the portable computing device;
detecting, by the one or more processors, when a user begins a store visit based upon the locations of the portable computing device;
when the user has begun the store visit, determining, by the one or more processors, a predicted shopping path of the user within the store based on the data, the predicted shopping path representing an order in which the user is predicted to visit shopping areas within the store;
in response to predicting the shopping path within the store and prior to the portable computing device coming within a first threshold distance of the first shopping area, pushing to the portable computing device, by the one or more processors, store-relevant materials associated with the first shopping area within the store;
directing, by the one or more processors, the portable computing device to, in response to the store-relevant materials associated with the first shopping area being pushed to the portable computing device and when the portable computing device becomes located less than the threshold distance from the first shopping area within the store during the subsequent store visit, present the pushed store-relevant materials associated with the first shopping area within the store to the user; and
directing, by the one or more processors, the portable computing device to, when the portable computing device is located at least a second threshold distance from the first shopping area, purge the store-relevant materials associated with the first shopping area from the portable computing device.

14. The method of claim 13, wherein detecting when the user begins the store visit comprises:
   detecting when the portable computing device crosses a geofence boundary associated with the store's location.

15. The method of claim 13, wherein determining the predicted shopping path comprises:
   comparing the data and information associated with the store.

16. The method of claim 15, wherein the information associated with the portable computing device includes one or more of:
   a unique portable computing device identifier;
   an operating system associated with the portable computing device; or
   a model associated with the portable computing device.

17. The method of claim 15, wherein the information associated with the store includes one or more of:
   a geographic region of the store; or
   a store layout.

* * * * *